Dec. 16, 1930. W. HERRSCHAFT 1,785,347
MEANS FOR PRODUCING THEATRICAL EFFECTS
Filed Sept. 24, 1926 2 Sheets-Sheet 1
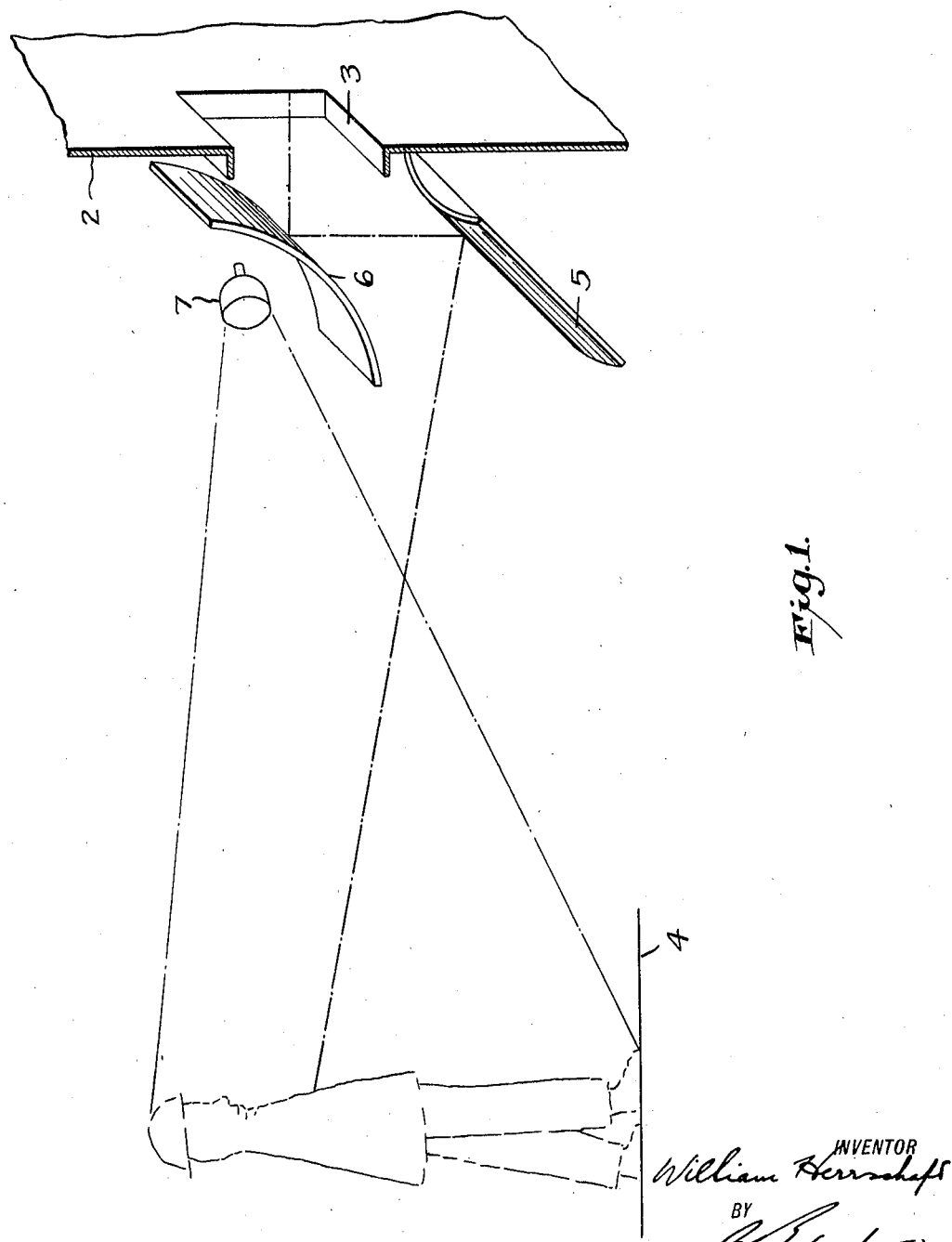

Dec. 16, 1930.   W. HERRSCHAFT   1,785,347
MEANS FOR PRODUCING THEATRICAL EFFECTS
Filed Sept. 24, 1926   2 Sheets-Sheet 2
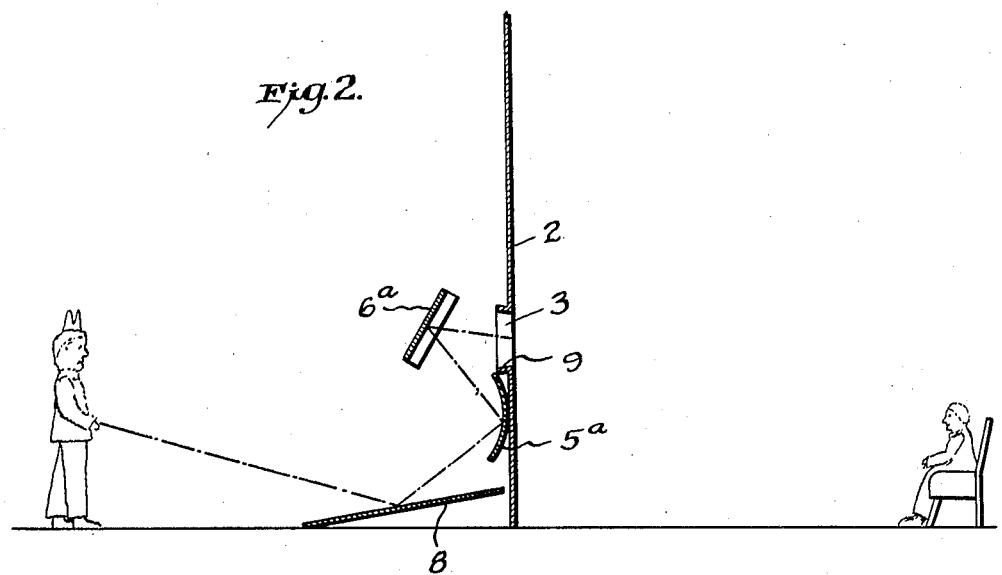
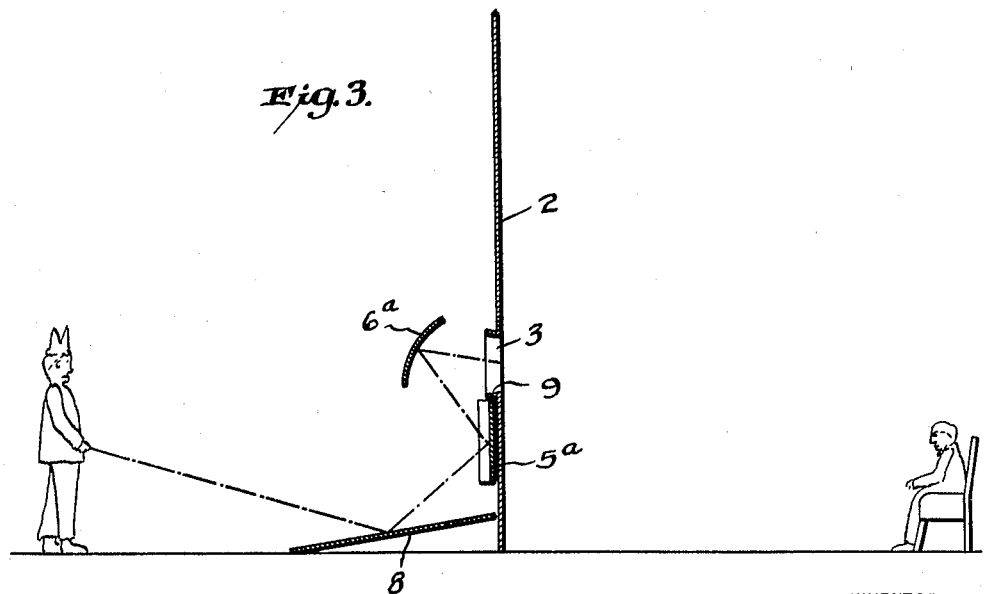
INVENTOR
William Herrschaft
BY
ATTORNEY Patented Dec. 16, 1930

1,785,347

UNITED STATES PATENT OFFICE

WILLIAM HERRSCHAFT, OF NEW YORK, N. Y.

MEANS FOR PRODUCING THEATRICAL EFFECTS

Application filed September 24, 1926. Serial No. 137,455.

Miniature theaters are known wherein a reduced image of a concealed stage and actors is formed and made visible to the audience by means of a concave (spherical) mirror, into which an inverted image is reflected by other mirrors. These spherical mirrors are very expensive and comparatively difficult to obtain, and an important object of my invention is to provide a much cheaper and more readily available means, which gives excellent results and affects certain other advantages. To this end my invention employs two cylindrical (curved) mirrors, so disposed in a circuitous path for the light rays from the stage to the audience that one mirror reduces the image of the concealed stage and actors in height, while the other reduces the image in width. The mirrors are arranged with their curvatures at right angles, and are of different radii, making the two reductions proportionate in the final image.

The cylindrical mirrors may be concave or convex. In the case of convex cylindrical mirrors, the two curved mirrors suffice, whereas the concave spherical mirror of the prior art calls for two additional plane mirrors, making three mirrors altogether, or else another concave spherical mirror, which is far more expensive. My cylindrical mirror system has also the advantage of requiring less lighting, which is a decided economy; and the convex cylindrical mirrors take in figures in all planes in a manner which is not possible with a concave spherical mirror.

The image formed with two cylindrical convex mirrors is virtual and erect. A real image can be obtained with two cylindrical concave mirrors plus a plane mirror so arranged as to invert the image.

The cylindrical mirrors are not only cheaper than spherical mirrors, but they can be readily obtained in any desired curvatures, whereas spherical mirrors are practically obtainable only in a certain few curvatures. My invention is, therefore, adaptable to any and all requirements, greatly increasing the range of applicability of these little shows or theatres.

In the accompanying drawings forming part hereof;

Figure 1 is a schematic view illustrating the invention employing two convex cylindrical curved mirrors; and Figs. 2 and 3 illustrate modes of carrying the invention into effect with two concave cylindrical curved mirrors and a plane mirror.

The numeral 2 designates an opaque screen or wall having a proscenium opening 3, through which the audience in front views the reflected show.

The concealed stage 4 is at any desired level, and may be the floor of a room. In front of the stage and below the proscenium opening is a convex cylindrically curved mirror 5, placed at an inclination so as to reflect light rays passing from the stage upward to another convex cylindrically curved mirror 6 disposed at an inclination behind the proscenium opening so as to reflect the rays outward to the audience. The stage is brightly lighted by lights, one of which is indicated at 7.

The two mirrors have their curvatures at right angles. Thus, all the arcs of the mirror 5 lie in planes perpendicular to the paper, while all the arcs of the mirror 6 lie in planes parallel with the paper. Furthermore, the mirror 6 has a longer radius of curvature than the mirror 5, corresponding to the greater distance which the rays travel before reaching the second mirror.

In the construction illustrated the first mirror reflects the image of the stage, scenery and actors, in such manner as to reduce the width while leaving the height unchanged. The second mirror then receives the image and reduces the height, proportionately to the reduced width, and it is this final image which is viewed by the audience.

If desired, mirrors might be employed which do not truly match, in which event any desired relative proportions of height and width might be obtained for comic effect.

Figs. 2 and 3 illustrate embodiments of the invention having cylindrical concave mirrors, giving a real image. The concave mirrors 5ª and 6ª are properly disposed with their curvatures at right angles, and 8 is a plane mirror disposed at a suitable angle to reflect the rays coming from the stage to the first of the cylindrical concave mirrors.

The invention is applicable as a form of marionette show, and may be used for fashion shows in store windows, and for other displays or entertainments. By appropriate arrangement it might be applied to reflect in the windows the general interior and activities of a store, the interior of the store being the stage. In any case, the degree of reduction may be as great or as little as the circumstances may call for. The term cylindrical designates the type of mirror. It will be understood that the curvature may be other than strictly circular.

In Figs. 2 and 3 the image is formed at the proscenium opening, the surface 9 at the bottom of the opening constituting a miniature stage.

I claim:

1. The combination with a concealed stage and means forming a proscenium opening, of means for forming a reduced reflected image of actors visible to the audience through said proscenium opening, said means comprising two cylindrical mirrors disposed with their curvatures at right angles, so that one reduces the image in width, while the other reduces it in height, substantially as set forth.

2. In a miniature theater, the combination with a concealed stage, of means for presenting a reduced reflected image of actors to the view of the audience, said means comprising two cylindrical mirrors so disposed with their curvatures at right angles that one mirror reduces the image in width, while the second mirror reduces the height of the image, substantially as set forth.

3. Means for presenting to an audience a reduced image of actors on a concealed stage, comprising two cylindrical mirrors disposed to successively reflect the light rays caused to pass in a circuitous path from the stage to the audience, said mirrors having their curvatures at right angles and of different radii, substantially as set forth.

4. Means for presenting to an audience a reduced image of actors on a concealed stage, comprising two cylindrical convex mirrors disposed to successively reflect the light rays caused to pass in a circuitous path from the stage to the audience, said mirrors having their curvatures at right angles and of different radii, substantially as set forth.

WILLIAM HERRSCHAFT.